(12) United States Patent
Bettray

(10) Patent No.: US 11,480,211 B2
(45) Date of Patent: Oct. 25, 2022

(54) FIXING DEVICE FOR FASTENERS HAVING A POLYGONAL HEAD

(71) Applicant: Ole Bettray, Wilhelmshaven (DE)

(72) Inventor: Ole Bettray, Wilhelmshaven (DE)

( * ) Notice: Subject to any disclaimer, the term of this patent is extended or adjusted under 35 U.S.C. 154(b) by 351 days.

(21) Appl. No.: 16/770,481

(22) PCT Filed: Dec. 13, 2017

(86) PCT No.: PCT/DE2017/101070
§ 371 (c)(1),
(2) Date: Jun. 5, 2020

(87) PCT Pub. No.: WO2019/114847
PCT Pub. Date: Jun. 20, 2019

(65) Prior Publication Data
US 2020/0386262 A1  Dec. 10, 2020

(51) Int. Cl.
*F16B 39/10* (2006.01)
*F16L 23/00* (2006.01)

(52) U.S. Cl.
CPC .......... *F16B 39/101* (2013.01); *F16L 23/003* (2013.01); *F16B 39/10* (2013.01)

(58) Field of Classification Search
CPC ........ F16B 33/002; F16B 39/00; F16B 39/08; F16B 39/10; F16B 39/101; F16B 39/20; F16L 23/003
USPC ............................ 411/81, 86, 87, 88, 90, 102
See application file for complete search history.

(56) References Cited

U.S. PATENT DOCUMENTS

| | | | | |
|---|---|---|---|---|
| 821,297 | A * | 5/1906 | Kohler | F16B 39/24 92/221 |
| 2,758,628 | A * | 8/1956 | Rice | F16B 39/101 411/87 |
| 4,133,583 | A | 1/1979 | Spisak | |
| 5,624,218 | A * | 4/1997 | Dauwalter | F16B 39/101 411/87 |
| 5,632,583 | A * | 5/1997 | Schneider | F16L 23/036 411/87 |
| 7,604,460 | B2 * | 10/2009 | Mestre | B64C 27/33 416/134 A |

(Continued)

FOREIGN PATENT DOCUMENTS

| | | |
|---|---|---|
| CN | 102554869 A | 7/2012 |
| DE | 672705 C | 3/1939 |

(Continued)

*Primary Examiner* — Roberta S Delisle
(74) *Attorney, Agent, or Firm* — Smartpat PLC

(57) ABSTRACT

A fixing device for fasteners having a polygonal head for the detachable connection of flanges which can be connected to one another and clamped against one another by a screw connection includes a chain which encompasses at least some regions of the lateral surface of the polygonal heads in a form-fitting manner and inhibits the rotation of said fasteners. The chain comprises a plurality of spaced members, each having at least one receptacle, the inner profile of which corresponds to the lateral surface of the polygonal heads. The chain comprises at least one releasable tensioner for detachably joining two ends of the chain. A flexible securing means is provided, which extends circumferentially along the chain, wherein at least two ends of the securing means can be releasably connected to one another.

15 Claims, 6 Drawing Sheets

(56) References Cited

U.S. PATENT DOCUMENTS

| | | | | |
|---|---|---|---|---|
| 7,927,049 B2* | 4/2011 | Adams | ................... | F16B 37/14 |
| | | | | 411/102 |
| 8,337,129 B2* | 12/2012 | Boyce | ................... | F16B 31/028 |
| | | | | 411/102 |
| 2007/0231103 A1* | 10/2007 | Evans | ................... | F16C 3/20 |
| | | | | 411/102 |
| 2020/0063784 A1* | 2/2020 | Summers | .............. | F16B 39/101 |

FOREIGN PATENT DOCUMENTS

| | | |
|---|---|---|
| JP | S57136016 A | 8/1982 |
| WO | 2017137021 A1 | 8/2017 |

* cited by examiner

FIXING DEVICE FOR FASTENERS HAVING A POLYGONAL HEAD

TECHNICAL FIELD

The present disclosure relates to a fixing device for fasteners having a polygonal head for the detachable connection of flanges or like-natured connecting parts.

BACKGROUND

A locking ring is known from document DE 672 705 A, the locking ring connecting and securing the nut screws, the hub and the rim disc to car wheels and consisting of a plurality of plates comprising the nuts, the plates being connected by tension springs under tension.

U.S. Pat. No. 2,758,628 A further shows means for restraining the retrograde rotation of a circular row of polygonal wheel support projections having a plurality of clip members equal to the number of tabs, wherein each clip element has a flat base and a pair of spaced parallel flanges, wherein an opening is provided between the flanges, and the wall surrounding the opening comprises notches to receive angular sections of the respective approach.

A vehicle wheel and cladding assembly are known from U.S. Pat. No. 4,133,583 A, which has a cladding part which is positioned in a preselected symmetrical relationship to the vehicle wheel by a holding element on the cladding part which engages in holding grooves which are designed in the nuts that are used to hold the vehicle wheel on its hub. The holding element has a guide device which engages with the nuts in order to prevent the cladding from being fastened to the wheel.

Furthermore, from the document CN 102 554 869 B, a fixing device of the type mentioned at the outset is characterized in that it comprises a fixing means, which encompasses at least some regions of the lateral surface of the polygonal heads of a plurality of fasteners in a form-fitting manner and inhibits the rotation of said fasteners. Said fixing means is designed as a chain and comprise a plurality of spaced members, each having at least one receptacle, the inner profile of which corresponds to the lateral surface of the polygonal heads, wherein the inner profile of individual members of the chain is designed to encompass some regions of the lateral surface of the polygonal heads in a form-fitting manner. The fixing means comprises at least one tensioner for detachably joining two ends of the fixing means.

Furthermore, from WO 2017137021 A1 is a fixing device for fasteners having a polygonal head for the detachable connection of flanges, which can be connected to one another by a screw connection and can be clamped against one another, wherein the fixing device comprises a fixing means which encompasses at least some regions of the lateral surface of the polygonal heads of a plurality of fasteners in a form-fitting manner and inhibits the rotation of said fasteners and the fixing means comprises a plurality of spaced members each having at least one receptacle, the inner profile of which corresponds to the lateral surface of the polygonal heads, wherein the fixing means is a chain and the inner profile of individual members of the chain is designed for encompassing some regions of the lateral surface of the polygonal heads in a form-fitting manner, wherein the fixing means comprises at least one tensioner for detachably joining two ends of the fixing means.

A disadvantage of said fixing devices is that they are not secured against unintentional detaching of the connection between the spaced ends of the fixing means of the chain to be connected and consequently against detaching of the fixing device from flanges or like-natured connecting parts.

The use of the fixing devices thus represents enormous safety risks for users as well as people working in the area of the device, since this can cause serious injuries due to their size and weight in the event of the connection being detached.

SUMMARY

The present invention has for its object to provide a fixing device that eliminates the aforementioned problems and reliably precludes an unintentional detaching of the fixing device from a flange or a like-natured connecting part.

The above object is achieved by a fixing device as claimed.

The fixing device is characterized in that a flexible securing means is provided which extends circumferentially along the fixing device. At least two ends of the securing means can be releasably connected to one another.

The securing means preferably circumferentially rests against the members of the fixing device and/or the spacing members which are provided between the members and the length of which corresponds essentially to the distance of the fasteners.

The circumferential fixation of the individual members or spacing members or other components of the fixing device which can be secured in a circumferential manner by means of a flexible securing means can reliably preclude an unintentional detachment of the fixing device from a flange or a like-natured connecting part. For example, when the fixing device tears, the securing means, which is advantageously a wire rope, prevents the fixing device from whipping around uncontrollably. The risk potential for people and nearby machines and devices is thus reduced to a minimum.

BRIEF DESCRIPTION OF THE DRAWINGS

Further objectives, features, advantages and possible uses of the fixing device arise from the following description of an embodiment with reference to the drawings.

DETAILED DESCRIPTION

Figure 1:
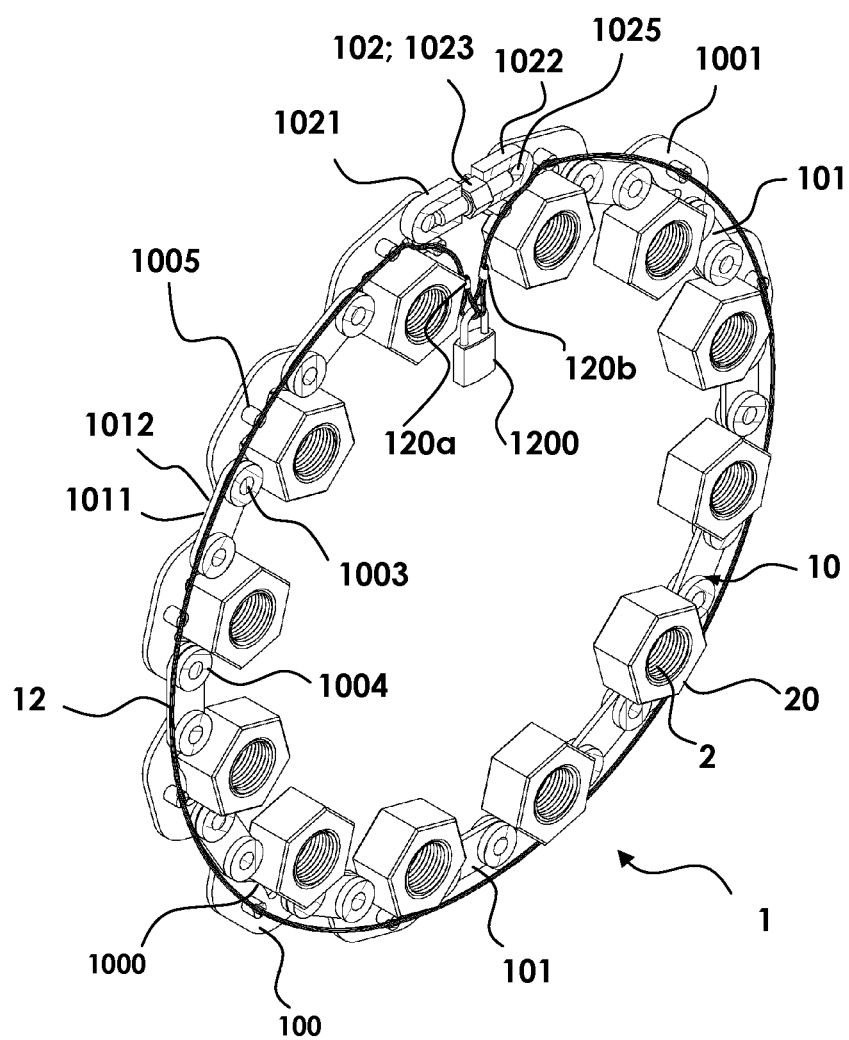
FIG. 1 shows a fixing device in a perspective sectional view on a flange connection.

As shown in FIG. 1, the fixing means 10 is preferably a chain 10, wherein the inner profile of individual members 100 of the chain 10 is designed for encompassing some regions of the lateral surface of the polygonal heads 20 in a form-fitting manner. Spacing members 101 are particularly advantageously provided between the members 100, the length of which spacing members essentially corresponds to the distance of the fasteners 2. In order to achieve an exact positioning and an ideal hold of the fixing means 10, the side members 1001 are preferably designed such that they essentially rest flat against the flange 3.

Figure 2:
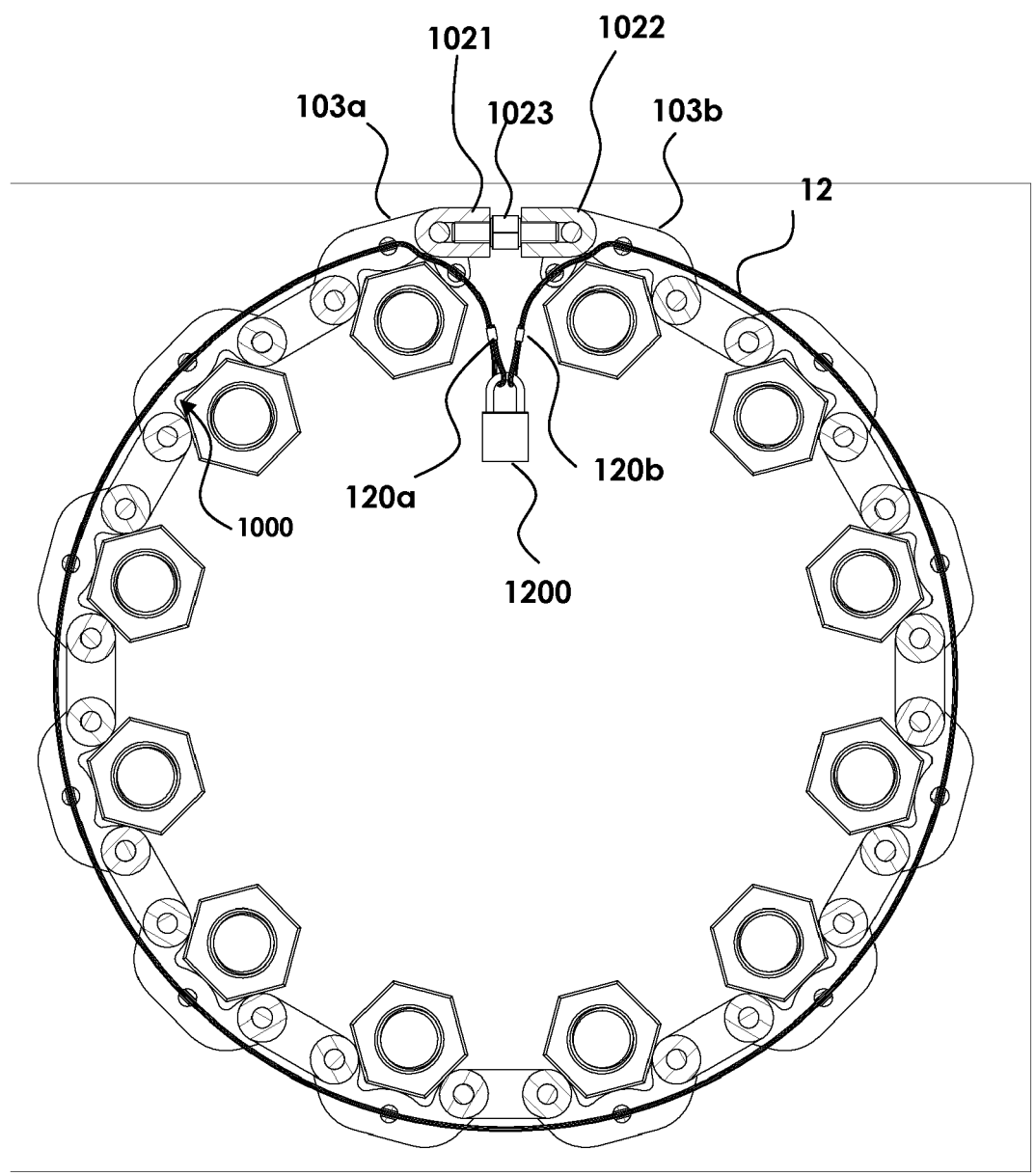
FIG. 2 shows the fixing means in sectional view.
Figure 3:
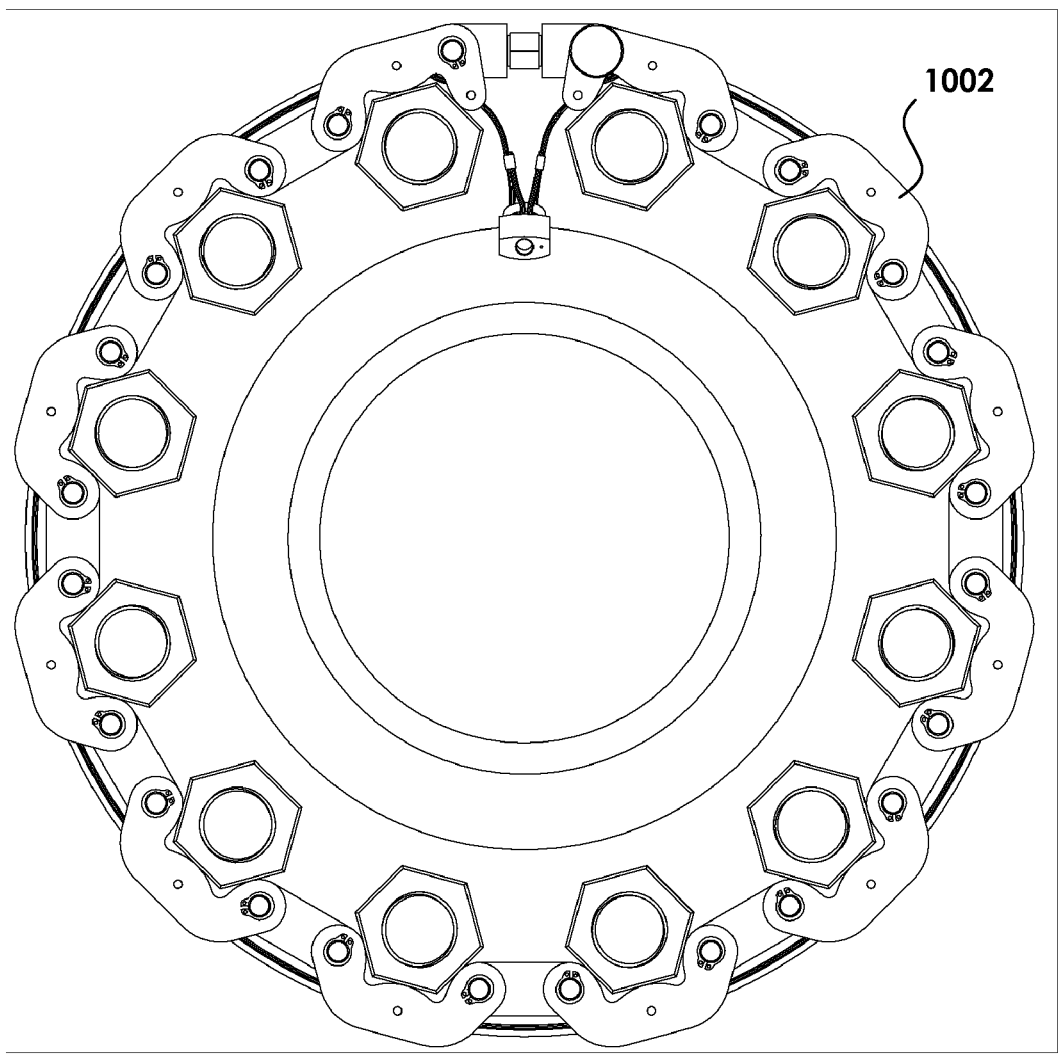
FIG. 3 shows the fixing means in plan view with front side members.
Figure 5:
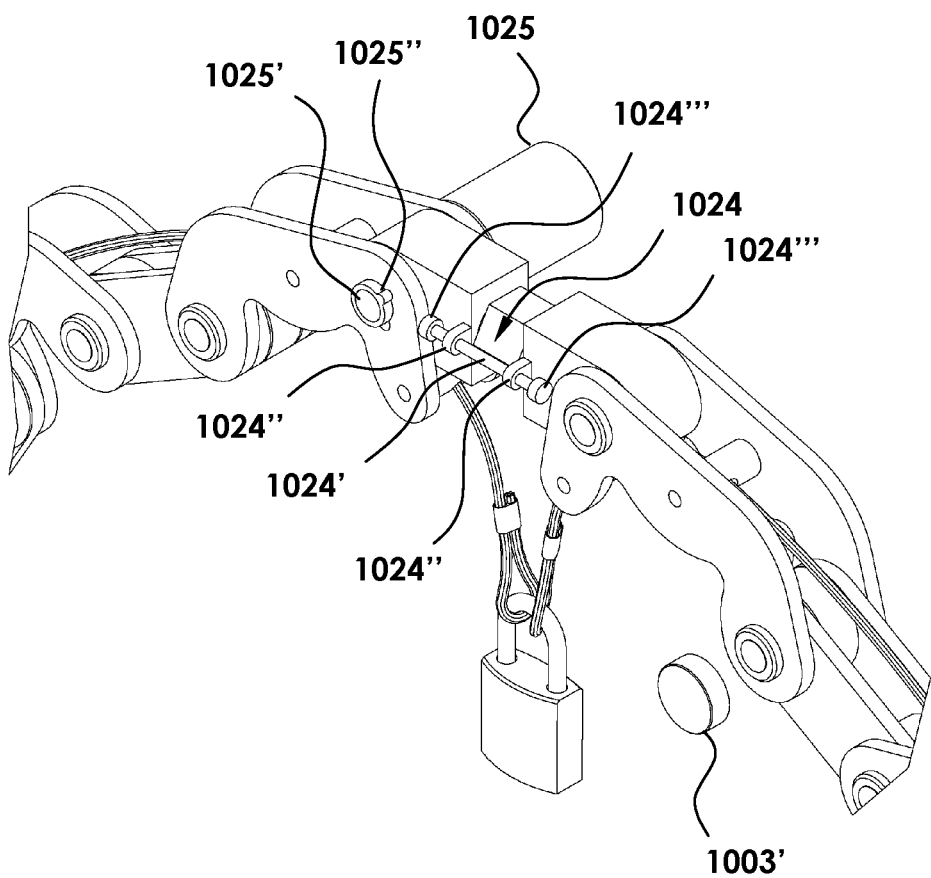
FIG. 5 shows a rear perspective detail view of the fixing device as illustrated in FIG. 4.
Figure 6:
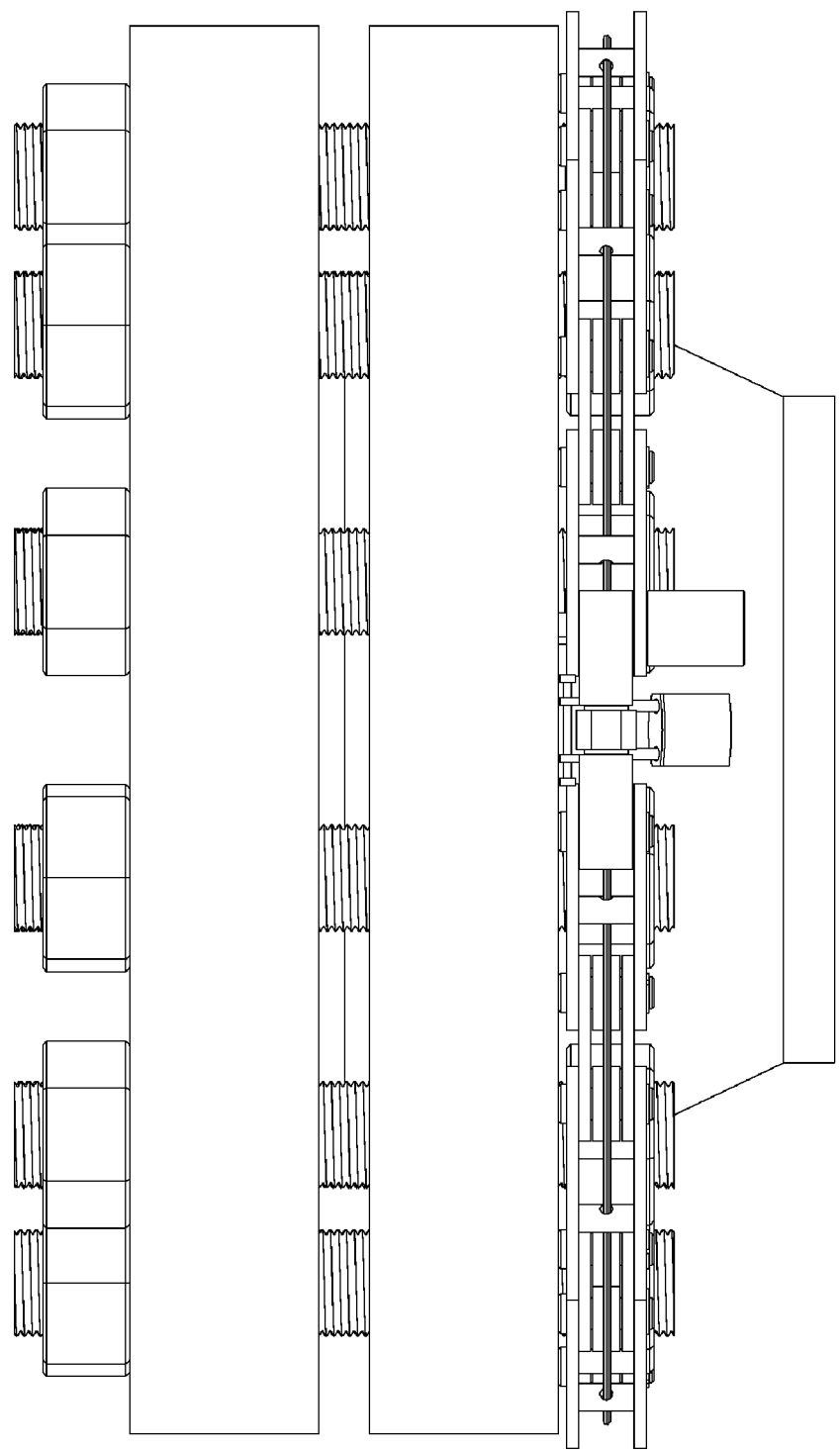
FIG. 6 illustrates a plan view from above of the fixing device on a flange connection.

As shown in FIGS. 1-3, the members 100 are formed from at least one side member 1001, and preferably have two side members 1001, 1002 arranged parallel, (FIG. 3) and at least one connecting bolt 1003 connecting the side members 1001, 1002 of the members 100 to one another. As shown in FIG. 5, neodymium magnets are integrated into the connecting bolts 1003 on one side (blind hole). The chain 10 will thus constantly rest against the flange 3. This also allows the chain 10 to be attached overhead (vertically) and thus also simplifies the screwing of vertical flange connections.

As shown in FIG. 5, the connecting bolts 1003 are advantageously provided with a cap 1003' in order to protect the integrated magnet against soiling, among other things. The main purpose of said cap 1003' is to prevent corrosion on different metals. That is, when an unpainted flange 3 consists of a less noble alloy than the connecting bolt 1003, the material there will start to corrode (rust). Severe material damage can occur when a chain 10 is used for securing the screw in the long term.

Furthermore, it is advantageous to form the spacing members 101 from at least two side members 1011, 1012 arranged essentially parallel to one another and at least one connecting bolt 1003 connecting the side members 1011, 1012 to one another. Hollow cylindrical spacing means 1004 are preferably arranged between the side members 1001, 1011, 1012, through which spacing means the connecting bolts 1003 are guided, wherein the flexible securing means 12 preferably rests against the connecting bolts 1003.

In a further embodiment, the fixing means 10 comprises at least one tensioner 102 for detachably joining two ends 103a, 103b of the fixing means 10. Said tensioner 102 is preferably designed as a clamping means and very particularly preferably adjustable in length. The tensioner 102 is, for example, a screw connection. In this case, the at least one tensioner 102 is advantageously formed for the detachable joining together of two ends 103a, 103b of the fixing means 10 from at least two connector parts 1021, 1022, which can be releasably connected to one another, wherein the connector parts 1021, 1022 can preferably be connected to one another by means of a quick release fastener 1023. The quick release fastener 1023 advantageously comprises at least one clamping screw 1023 which connects the two connector parts 1021, 1022 so that they can be screwed together.

Due to the protruding contour (compared to the contour sheet), it is possible to connect the securing means 12 below the tensioner 102 and thus enabling an easy tightening/loosening of the tensioner 102 or the locking of the fixing device 1, for example, by means of the quick release sheets.

The at least two ends 120a, 120b of the securing means 12—seen in the circumferential direction—are furthermore preferably releasably connected to one another below the at least one releasable tensioner 102 between two polygonal heads 20.

Moreover, as shown in FIGS. 1 and 2, the at least two ends 120a, 120b are preferably connected to one another by means of a lock 1200.

In an advantageous embodiment, pin-like fixing means with transverse bore 1005 for fixing the securing means 12 is provided on the side members 1001 for guiding the securing means 12, which prevents the securing means 12 from jumping out of the fixing device 1 (threaded).

Figure 4:
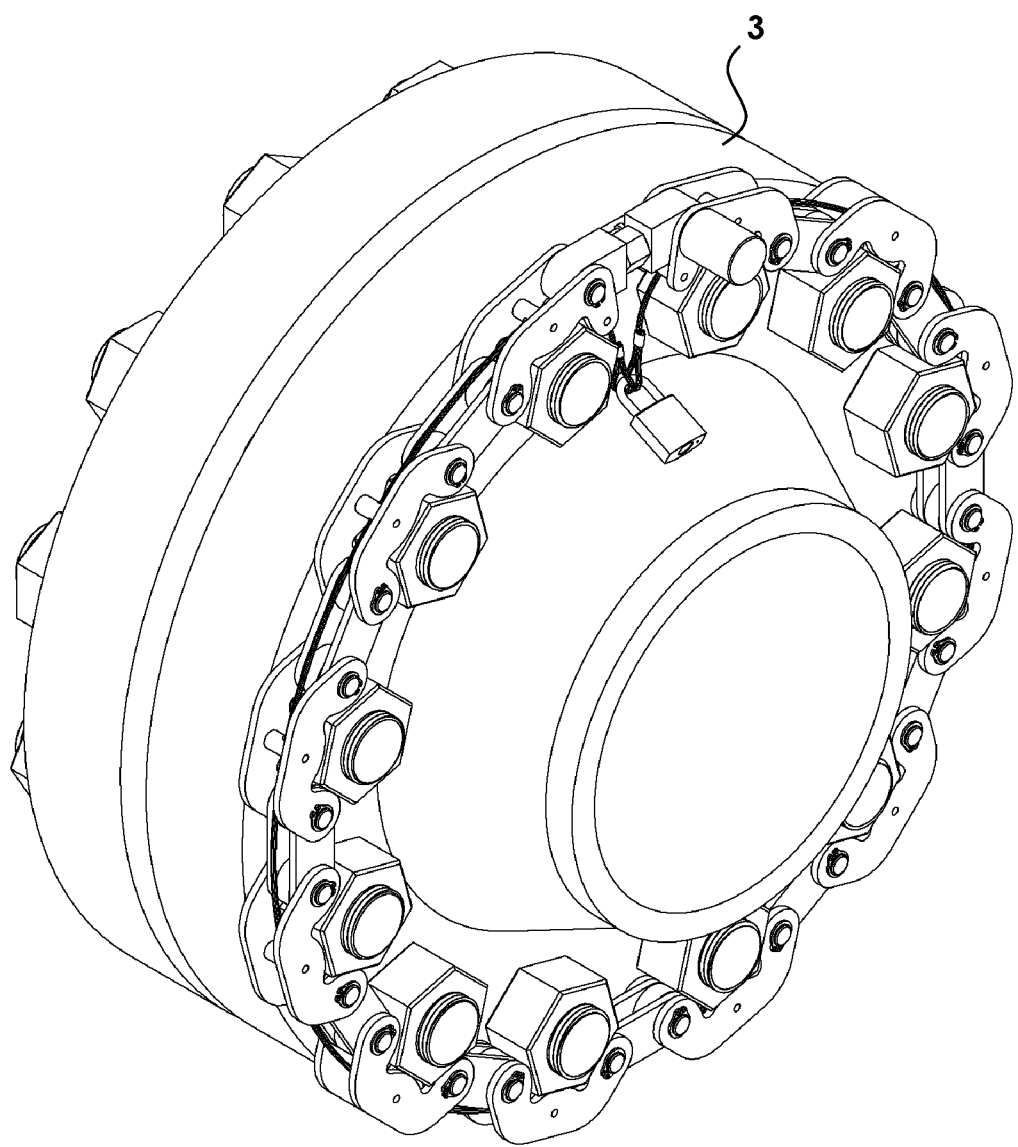
FIG. 4 shows the fixing device on a flange in a further embodiment in a perspective view.

FIGS. 4 and 5 show the fixing device 1 on a flange 3 in a further advantageous embodiment, in each case in perspective rear views.

As shown in FIG. 5, a connecting device 1024, which holds the two spaced connecting parts 1021, 1022 at a defined maximum distance, is preferably provided, which prevents the advantageously provided clamping screw 1023 from the connecting parts 1021, 1022 or the correspondingly provided threads on the connecting parts 1021, 1022 from being turned when the quick release fastener is untwisted.

The connecting bolt 1024 is advantageously formed from a bolt, style or rod-like connector part 1024', which is slidably guided on receptacles 1024" of the connecting parts 1021, 1022, wherein stoppers 1024''' are provided on the end sides of the connector 1024', which effectively prevent the connector 1024' from sliding out of the receptacles 1024".

This effectively prevents the clamping screw 1023 from coming off when the connection is detached and thereby damaging the connection or even completely losing the clamping screw 1023.

As further shown in FIGS. 1 to 5, a locking pin 1025 fixing the connecting part 1022 is provided on the quick release fastener 1023, a step being formed onto the same at the locking pin's tip 1025' according to FIGS. 4 and 5, onto which step a sheet 1025" having a projection is placed or glued. The locking pin 1025 can be guided through a corresponding recess in the clamping sheet or on the clamping block. Falling out is no longer possible when the locking pin 1025 is turned. The zero position for pulling out can be seen on the front side.

The fixing device 1 is not limited in its design to the preferred embodiments specified above. Rather, a multitude of design variations are conceivable, which make use of the solution illustrated even when the execution is fundamentally different.

LIST OF REFERENCE NUMBERS 1 fixing device
2 fasteners, nuts on the flange
3 flange
10 fixing means, chain
12 flexible securing means
20 polygonal heads
100 member
101 spacing member
102 tensioner on the fixing means
103a, 103b ends of the fixing means
120a, 120b ends of the securing means
1000 receptacle
1001,1002 side members
1003 connecting bolt
1003' cap on the connecting bolts
1004 spacing means
1005 pin-like fixing means
1011,1012 side members of the spacing members
1021,1022 connector parts
1023 quick release fastener
1024 connecting device
1024' bolt, style or rod-like connector part
1024" receptacles
1024''' stopper
1025 locking pin
1025' tip on the locking pin
1025" sheet having projection
1200 lock for the ends of the securing means

The invention claimed is:
1. A fixing device (1) for securing a plurality of fasteners (2), each having a polygonal head, that detachably connect two flanges (3) to one another, the fixing device (1) comprising:

a chain (10) having
members (100) which are configured to encompass some regions of lateral surfaces of the polygonal heads (20) in a form-fitting manner and thereby inhibit rotation of the plurality of fasteners (2) and
a tensioner (102) for detachably joining two ends (103*a*, 103*b*) of the chain (10); and
a flexible securing means (12) for fixing components of the fixing device (1), the flexible securing means extending circumferentially along the fixing device (1) and having two ends (120*a*, 120*b*) which can be detachably connected to one another.

2. The fixing device (1) according to claim 1,
wherein the flexible securing means (12) rests against the members (100) of the chain (10).

3. The fixing device (1) according to claim 1,
wherein spacing members (101) are provided between the members (100), a length of which spacing members essentially corresponds to a distance between the fasteners (2), and
wherein the flexible securing means (12) rests against the spacing members (101).

4. The fixing device (1) according to claim 3,
wherein the members (100) are each formed from at least one side member (1001, 1002) and at least one connecting bolt (1003) connecting the side members (1001, 1002) of the members (100) to one another, and
wherein the spacing members (101) are formed from at least two side members (1011, 1012) arranged essentially parallel to one another and at least one connecting bolt (1003) connecting the side members (1011, 1012) to one another, and
wherein the flexible securing means (12) rests against the connecting bolts (1003).

5. The fixing device (1) according to claim 4,
further comprising pin-shaped fixing means (1005) for fixing the flexible securing means (12) on the side members (1001, 1002).

6. The fixing device (1) according to claim 4,
wherein the tensioner (102) is formed from two connector parts (1021, 1022) which can be detachably connected to one another.

7. The fixing device (1) according to claim 6,
wherein the two ends (120*a*, 120*b*) of the flexible securing means (12) are releasably connected to one another between two polygonal heads (20).

8. The fixing device (1) according to claim 7,
wherein the two ends (120*a*, 120*b*) are connected to one another by a lock (1200).

9. The fixing device (1) according to claim 6,
wherein the connector parts (1021, 1022) are connected to one another by a quick release fastener (1023).

10. The fixing device (1) according to claim 9,
wherein the quick release fastener (1023) comprises a clamping screw (1023) which connects the two connector parts (1021, 1022) to one another by screws.

11. The fixing device (1) according to claim 10,
wherein a connecting device (1024) is provided which holds the two spaced connecting parts (1021, 1022) at a defined maximum distance, which prevents the clamping screw (1023) from the connecting parts (1021, 1022) or correspondingly provided threads on the connecting parts (1021, 1022) from being turned when the quick release fastener (1023) is untwisted.

12. The fixing device (1) according to claim 11, wherein the connecting bolt (1024) is slidably guided on receptacles (1024") of the connecting parts (1021, 1022), and
wherein stoppers (1024") are provided on end sides of the connector (1024'), which stoppers effectively prevent the connector (1024') from sliding out of the receptacles (1024").

13. The fixing device (1) according to claim 9,
wherein a locking pin (1025) fixing the connecting part (1022) is provided on the quick release fastener (1023), a step being formed on a tip (1025') of the locking, onto which tip step a sheet (1025") having a projection is placed or glued.

14. The fixing device (1) according to claim 4,
further comprising neodymium magnets integrated into the connecting bolts (1003) on one side.

15. The fixing device (1) according claim 4,
wherein the connecting bolts (1003) are provided with a cap (1003').

* * * * *